No. 735,805. PATENTED AUG. 11, 1903.
J. W. PEIFER.
BROOM CORN HARVESTER.
APPLICATION FILED OCT. 10, 1901.
NO MODEL.
5 SHEETS—SHEET 1.

John W. Peifer, Inventor

Witnesses

No. 735,805. PATENTED AUG. 11, 1903.
J. W. PEIFER.
BROOM CORN HARVESTER.
APPLICATION FILED OCT. 10, 1901.
NO MODEL. 5 SHEETS—SHEET 4.

John W. Peifer, Inventor

Witnesses

By

Attorney

No. 735,805. PATENTED AUG. 11, 1903.
J. W. PEIFER.
BROOM CORN HARVESTER.
APPLICATION FILED OCT. 10, 1901.
NO MODEL.
5 SHEETS—SHEET 5.
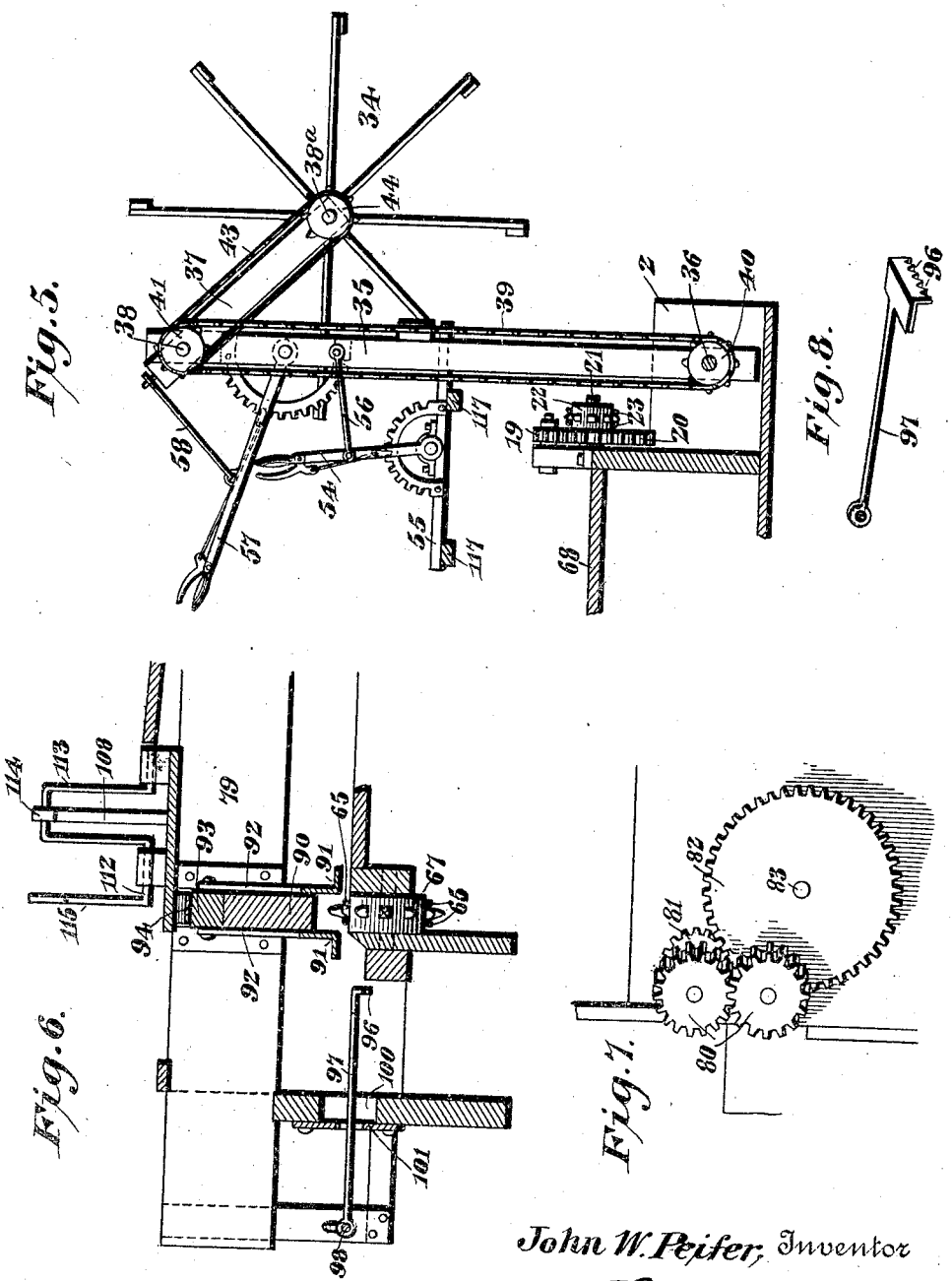

No. 735,805.

Patented August 11, 1903.

UNITED STATES PATENT OFFICE.

JOHN WESLEY PEIFER, OF SULLIVAN, ILLINOIS, ASSIGNOR OF TWO-THIRDS TO JAMES H. THOMAS AND WILLIAM S. SKIFF, OF SHELBY COUNTY, ILLINOIS.

BROOM-CORN HARVESTER.

SPECIFICATION forming part of Letters Patent No. 735,805, dated August 11, 1903.

Application filed October 10, 1901. Serial No. 78,222. (No model.)

*To all whom it may concern:*

Be it known that I, JOHN WESLEY PEIFER, a citizen of the United States, residing at Sullivan, in the county of Moultrie and State of Illinois, have invented a new and useful Broom-Corn Harvester, of which the following is a specification.

This invention relates to harvesting-machines, and has for its object to provide an improved machine of this character for harvesting broom-corn while standing in the field and to deliver the product of the machine—i. e., the brush or heads of the corn—in bundles, which are deposited upon the ground upon one side of the machine. It is furthermore designed to carry the brush from the cutting apparatus to a recutting device, so as to cut the heads of equal lengths and then to carry the same to a threshing apparatus for the purpose of removing the grain from the brush without injuring the brush, which is to be afterward formed into brooms.

Another object is to effectually carry off the butt-ends of the brush which have been cut therefrom by the recutting apparatus, and thereby to prevent choking of the feed apparatus.

Another object is to provide for collecting the brush as it emerges from the threshing apparatus so as to form the same into bundles, which may be conveniently deposited upon the ground at one side of the machine without stopping the latter and at the convenience of the operator thereof.

A final object is to provide for severing the cornstalks adjacent to the ground after the brush has been cut therefrom, thereby to leave only the stubble standing in the field for the passage of the machine.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
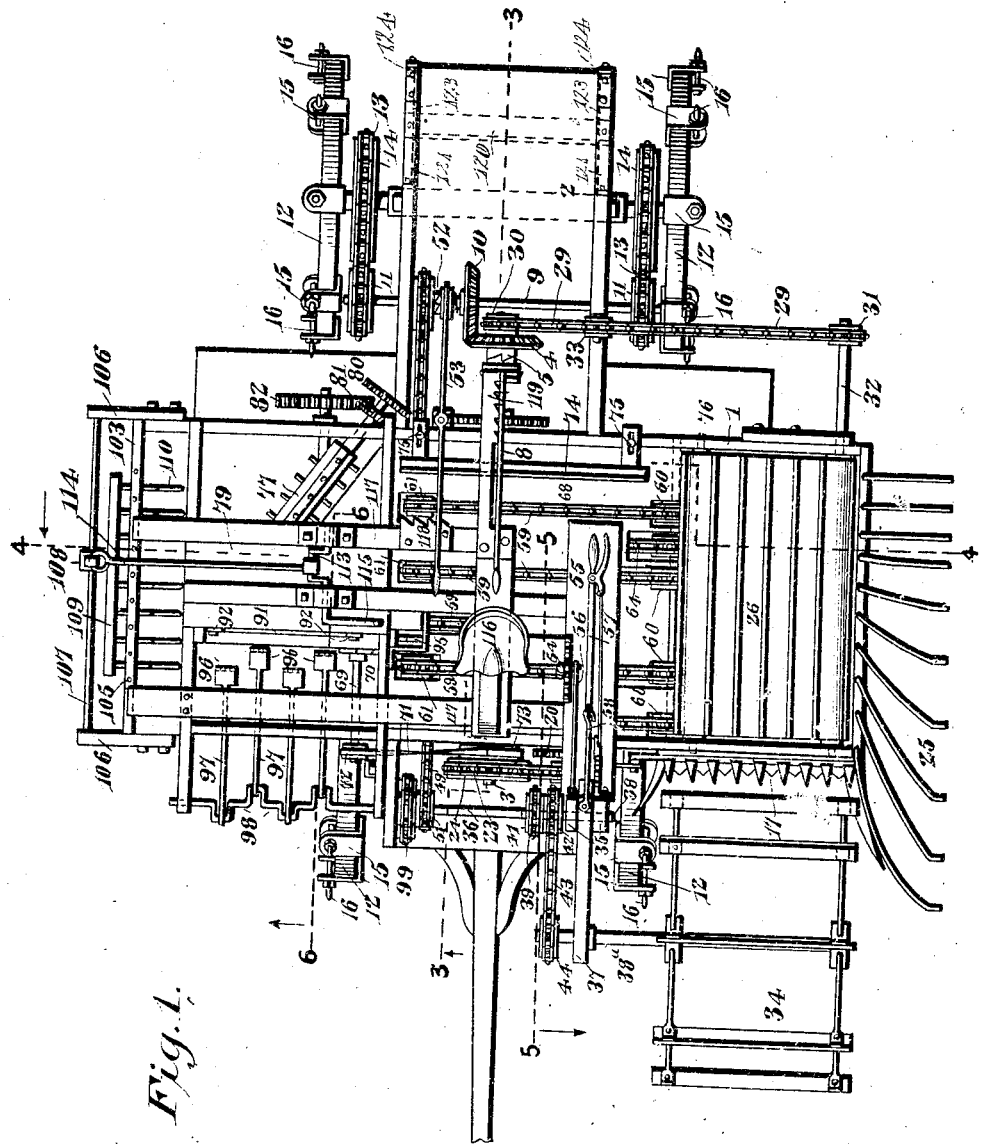
Figure 2:
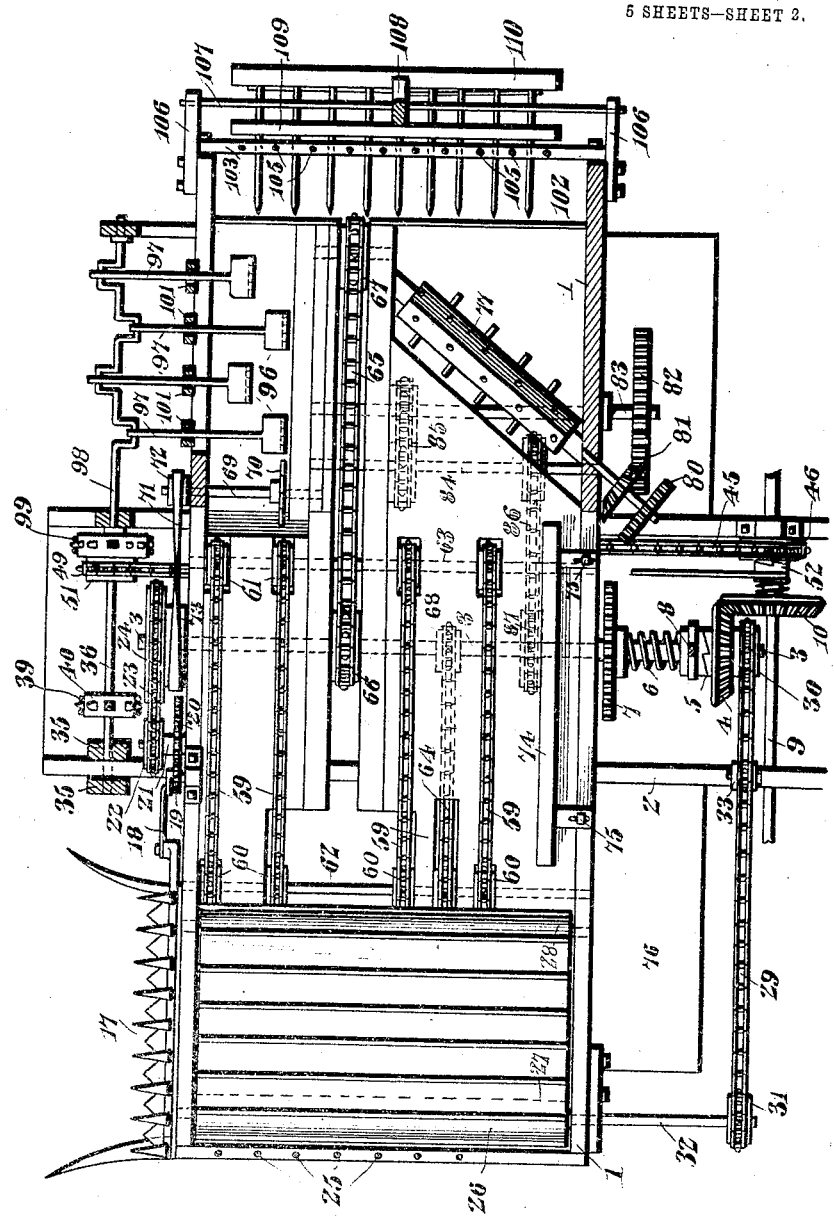
Figure 3:
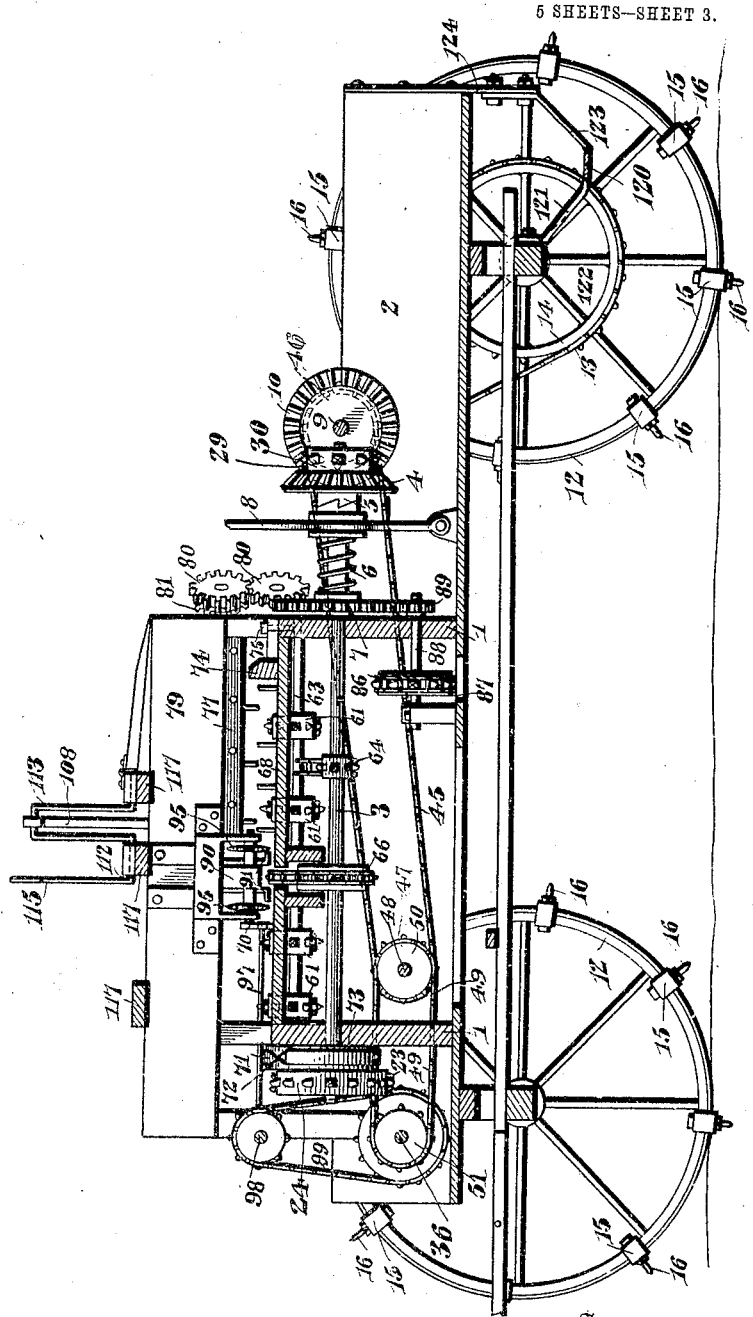
Figure 4:
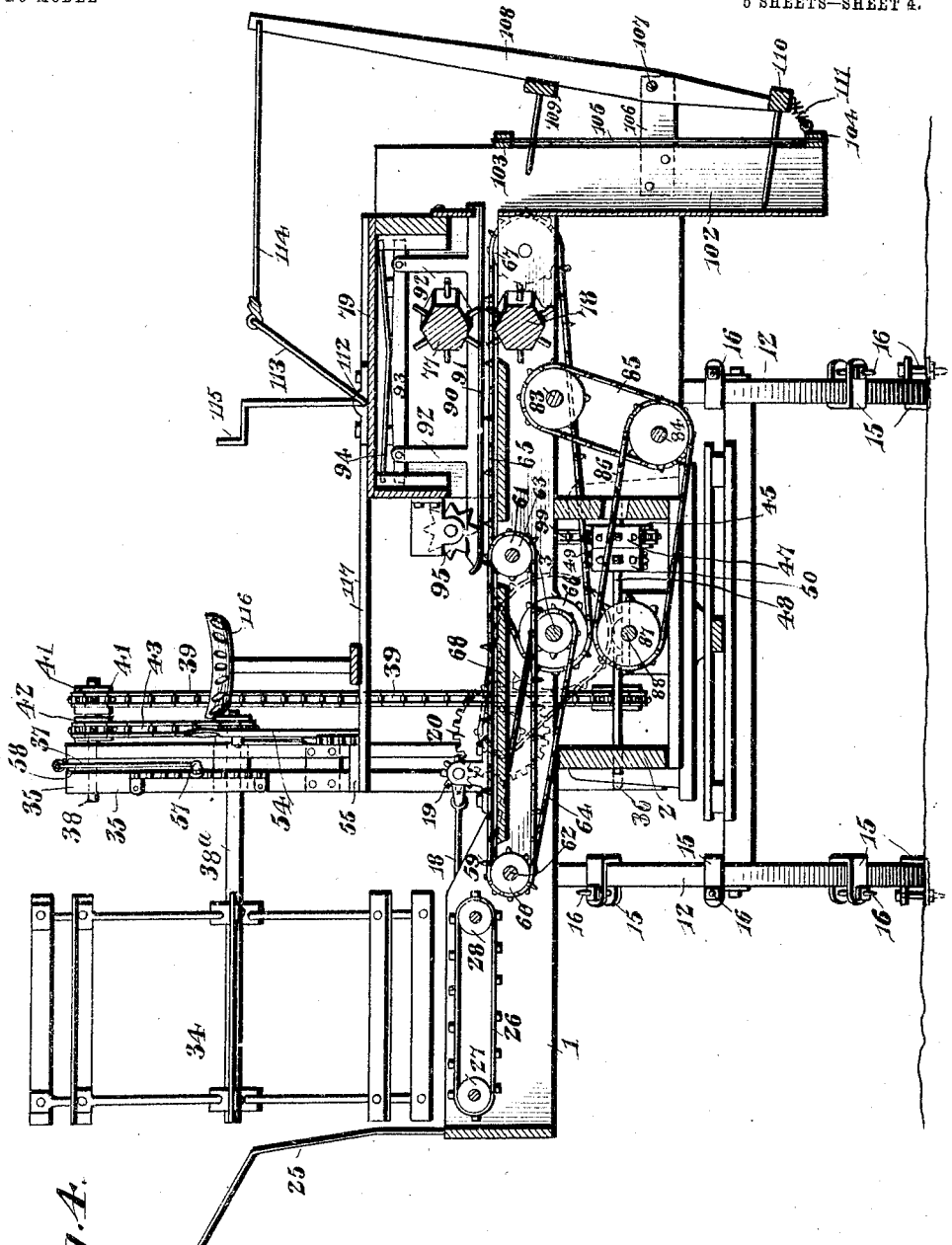

In the drawings, Figure 1 is a plan view of a broom-corn harvesting-machine constructed and arranged in accordance with the present invention. Fig. 2 is a detail plan section thereof. Fig. 3 is a longitudinal sectional view taken on the line 3 3 of Fig. 1. Fig. 4 is a transverse sectional view taken on the line 4 4 of Fig. 1. Fig. 5 is a detail sectional view taken on the line 5 5 of Fig. 1. Fig. 6 is a detail sectional view taken on the line 6 6 of Fig. 1. Fig. 7 is a detail view to illustrate the manner of driving the threshing apparatus. Fig. 8 is a detail perspective view of one of the rake-shaped chopping or butter devices for removing partly-severed butt-ends of the brush or heads of the corn.

Like characters of reference designate corresponding parts in all of the figures of the drawings.

In carrying out the present invention there is provided a rectangular frame 1, which is preferably oblong in shape and is supported transversely upon the forward portion of any ordinary form of vehicle, which is designated by the numeral 2, whereby the machine may be conveniently transported from place to place.

For the operation of the several parts of the machine there is provided a main drive-shaft 3, which is mounted substantially at the center and transversely of the frame 1, and thereby longitudinally with respect to the supporting-vehicle. The rear end of this shaft is projected beyond the rear end of the frame 1 and is provided with a beveled gear 4, with which is associated a clutch 5, the movable member of which is normally held in engagement with the fixed member by means of a helical spring 6, embracing the shaft and bearing against a gear 7, carried by and movable with the shaft, there being a lever 8 fulcrumed to the bottom of the wagon or main frame of the machine and connected to the movable member of the clutch for the purpose of throwing the machine into and out of operation. A counter-shaft 9 is mounted transversely of the wagon-body and is provided with a beveled gear 10 in mesh with the gear 4, the opposite ends of this counter-shaft being projected beyond the outer sides of the wagon and provided with sprocket-wheels 11, to be driven from the adjacent rear wheels 12 by means of sprocket-chains 13, running over sprocket-wheels 14, carried by the rear wheels of the vehicle.

To prevent slipping of the wheels of the vehicle, each of them is provided with a plurality of substantially U-shaped clips 15, which embrace the rim of the wheel and have their opposite ends projected upon the outer side thereof and pierced by means of pointed bolts 16, whereby the clips are clamped upon the rim, and the pointed ends of the bolts form teeth to enter the ground and insure proper rotation of the wheels.

The cutting apparatus of the machine is located at the forward left-hand side of the main frame 1, as indicated at 17, and is of the type commonly employed in harvesting-machines, the cutter-bar thereof being driven from the main drive-shaft 3 through the medium of a pitman 18, connected at opposite ends to the cutter-bar, and a crank-pinion 19, journaled upon the forward side of the frame and in mesh with a larger gear 20, mounted upon a stub-shaft 21, projected from the front of the frame and also carrying a sprocket-wheel 22, there being a sprocket-chain 23, passing over the sprocket-wheel 22, and a larger sprocket-wheel 24, carried by the forward end of the shaft 3, which is projected in front of the frame. Suitable guard-fingers 25 rise from that end of the frame 1 which is adjacent to the outer end of the cutting apparatus, and in rear of the latter there is provided an endless apron 26, which travels over the opposite rolls 27 and 28, as best illustrated in Fig. 4 of the drawings, said rolls being journaled in the opposite longitudinal sides of the frame, whereby the apron is designed to travel inwardly from the adjacent end of the frame, so as to carry the brush from the cutting apparatus and transversely of the entire machine to the opposite side thereof for subjection to the recutting apparatus and the threshing apparatus, as hereinbefore indicated. The apron or conveyer 26 is driven from the rear end of the main shaft 3 by means of a sprocket-chain 29, running over a sprocket-wheel 30 upon the rear end of the main drive-shaft and also over a sprocket-wheel 31 upon the rear end of the rearwardly-extended journal 32 of the outer roll 27. Upon the adjacent side of the vehicle-body or wheeled frame there is provided a guide 33 for carrying the sprocket-chain over the side of the vehicle.

In front of the cutting apparatus there is provided the usual reel 34, which is supported from an upright frame 35, comprising a pair of standards which embrace the adjacent side of the vehicle and are pivotally mounted upon a shaft 36, which pierces the opposite sides of the wagon. Between the upper ends of the standards there is pivotally mounted a forwardly-projected arm 37, which is mounted upon a shaft 38, piercing the opposite sides of the standard 35, and the shaft 38ᵃ of the reel is journaled in the outer free end of the arm 37. The reel is driven from the shaft 36 by means of a vertically-disposed sprocket-chain 39, running over a sprocket-wheel 40 of the shaft 36 and a sprocket-wheel 41 upon the shaft 38, there also being a sprocket-wheel 42 upon the shaft 38, over which runs a sprocket-chain 43, that also runs over a sprocket-wheel 44 upon the shaft of the reel. The shaft 36 is driven by the counter-shaft 9 at the rear of the machine by means of a sprocket-chain 45, running over a sprocket-wheel 46 upon the shaft 9 and also over a sprocket-wheel 47, carried by a counter-shaft 48, journaled in the opposite sides of the vehicle-frame and below the transverse frame 1, as best illustrated in Fig. 3 of the drawings. Power is transferred from the shaft 48 to the shaft 36 by means of a sprocket-chain 49, traveling over a sprocket-wheel 50 upon the shaft 48 and a corresponding wheel 51 upon the shaft 36. As indicated in Figs. 1 and 2, it will be seen that the drive connection between the shaft 9 and the reel 34 may be thrown out of operation by means of a clutch device 52, which is controlled by means of a suitable lever 53, mounted upon the frame of the machine.

For the adjustment of the reel it is designed to swing the supporting-frame 35 in a forward and rearward direction by means of a ratchet-lever 54, which is mounted upon a supplemental frame portion 55, which is projected inwardly from the opposite end of the main frame, the lever being connected to the upper portion of the frame 35 by means of a link or rod 56, whereby the reel-frame may be adjustably swung upon its pivotal support formed by the shaft 36, thereby to adjust the reel toward and away from the cutting apparatus. It is also designed to adjustably raise and lower the reel through the medium of the pivotal arm 37, which is under the control of a ratchet-lever 57, mounted upon the frame 35 and connected to the upper end of the arm 37 by means of a pivotal rod or link 58, whereby the arm 37 may be adjustably swung in a vertical direction upon the shaft 38.

After the brush has been cut by the cutting apparatus it falls over upon the apron or conveyer 26 under the action of the reel 34 and is thence to be carried to the recutting apparatus by means of fingered conveyer-chains 59, running over corresponding sprocket-wheels 60 and 61, carried by the respective shafts 62 and 63, the outer shaft 62 being driven from the main driving-shaft 3 by means of sprocket-chains 64, running over suitable sprocket-wheels upon the main drive-shaft and the shaft 62. As plainly indicated in Fig. 2, it will be seen that the feed-chains 59 are arranged in front and rear pairs, and a single endless and fingered conveyer-chain 65 has its inner portion located between said pairs of chains and extended therefrom to the opposite end of the frame, said chain 65 running over a sprocket-wheel 66 upon the main drive-shaft 3 and also over the sprocket-wheel 67, mounted upon the frame. It will of course be understood that the intermediate portion of the main frame is provided with a table 68, and this table is provided with suitable openings for the several feed-chains and also provided with a longitudinal slot for the reception of the feed-chain 65.

The forward outer portion of the table 68 is cut away, and across this cut-away portion, at the inner end thereof, there is provided a shaft 69, which carries a cutter-wheel 70, located adjacent to the rear edge of the cut-away portion and also adjacent to the conveyer-chains 59, so as to sever the butts of the brushes as they are carried along by the feed-chains. The cutter-shaft is driven from the main shaft 3 by means of a belt or other connection 71, traveling over suitable wheels or pulleys 72 and 73 upon the forward ends of the shafts 69 and 3, respectively.

As the brush is being carried along by the conveyer device 59 the heads thereof are drawn up against an evener device 74, comprising a board or plate stood on edge parallel with the conveyer and upon the rear portion of the table 68, said evener device being adjustable toward and away from the conveyer by means of suitable fastenings 75 connecting the board to the table. A suitable support or platform 76 is projected outwardly from the wheeled frame of the device and toward the apron 26 for the convenience of one of the operators of the machine, who is to draw the brush up against the evener device, so that after passing the recutting-wheel the brush will be of uniform length.

It will here be observed that the evener device 74 is located between the primary cutting apparatus 17 and the recutting device 70 in order that the heads may be evened before they are subjected to the recutting device, and, moreover, the evener device is adjustable toward and away from the recutting device, so as to vary the lengths of the recut heads.

After the brush has been cut into uniform lengths it is subjected to the threshing apparatus, comprising upper and lower rolls 77 and 78, which are provided with suitable teeth or pins and are located outwardly from and in rear of the recutting apparatus. Both rolls are inclined outwardly with respect to the longitudinal axis of the machine, and the lower roll is journaled upon the transverse frame and in an opening formed by cutting away the outer rear portion of the table 68. The upper roll 77 is journaled in opposite sides of a housing 79, which is carried by the outer end of the frame. The threshing-rolls are connected for simultaneous rotation by having their rear journals projected through the frame and housing and provided with intermeshed gears 80, the lowermost roll being driven from the main shaft 3 by a train of gearing including a beveled pinion 81, carried by the rear journal of the roll and in mesh with a gear 82, journaled upon a shaft 83, which is mounted transversely beneath the rolls and is driven from a lower shaft 84 by means of suitable sprocket-gearing 85, the shaft 84 being located below the shaft 83 and driven by means of a sprocket-chain 86, running over a sprocket wheel 87, mounted beneath the main drive-shaft and upon a counter-shaft 88, having a pinion 89 in mesh with the gear 7 upon the rear end portion of the main shaft 3.

As the shaft of the recutting device is located below the table 68, over which the corn passes, and the recutting-wheel 70 is projected above said table, the tendency of the wheel is to force the corn upwardly and away from the same, and to overcome this tendency and thereby insure effective cutting operation means has been provided to hold the corn firmly against the table, and comprises a cross-bar 90, as best illustrated in Figs. 4 and 6 of the drawings, said cross-bar being located within the housing 79 and disposed longitudinally over the conveyer 65 and also spaced above the same, so as to afford a passage for the butt-ends of the brushes. At each side of this cross-bar there is a provided a shoe 91, formed by an angle-iron having its lower horizontal flange member directed outwardly and also provided with upstanding arms 92, which project above the cross-bar and are connected to a vertically-yieldable cross-head 93, which carries a bowed spring 94, secured at an intermediate point to the top of the cross-head and having its opposite free ends frictionally engaging the top of the housing 79, whereby the shoes exert a downward pressure upon the butt-ends of the brushes, so as to hold the same firmly against the table, and at the same time are vertically yieldable to accommodate for thick brushes, and thereby to prevent choking of the cutting and threshing apparatus. To facilitate the feed of the brush, a pair of idle spur-gears 95 are journaled at opposite sides of the forward end of the cross-bar 90, which projects in front of the housing, as best indicated in Figs. 3 and 4 of the drawings. The purpose of these spur-gears is to pack or force the stems of the brush snugly between the teeth of the feed or conveyer chain 65, so that the latter may have a firm hold upon the brush to prevent the same from being withdrawn from the chain under the action of the threshing-rolls.

In some instances the butt-ends of the brushes may not be entirely severed from the heads thereof, and therefore means has been provided for pulling the partly-severed butt-ends form the heads of the brushes and comprising a plurality of chopping devices or butters 96, located in the open space in rear of the recutting-wheel and having shank portions 97 connected with the respective double-crank portions of a crank-shaft 98, journaled in forward extensions of the housing 79 and operated from the shaft 36 by means of suitable gearing 99. As best indicated in Fig. 6, it will be seen that each butter-shank 97 works through an opening 100, formed in the forward side of the housing 79, said opening being provided with a perforated wear-plate 101 to support the shank and also to form an intermediate fulcrum therefor, so as to give the shank a rocking movement under the influence of the up-and-down movement of the outer end thereof in addition to the reciprocatory movement of the shank. As shown in Fig. 2, it will be seen that the cranks of the crank-shaft 98 are alternately arranged for the purpose of alternately operating the several butters, which are adapted to engage the partly-severed butt-ends of the brushes and pull the same from the heads thereof, whereby the butt portions are adapted to drop downwardly from the machine. It will now be noted that the shoes 91 also prevent the heads of the brushes from being pulled outwardly under the action of the butters in removing the partly-severed butts therefrom.

Under the action of the threshing-rolls the seed is removed from the head of the brush and drops downwardly through the opening in the bottom of the housing in which the rolls are mounted, and the threshed brush is carried outwardly by the conveyer 65, from which it escapes and drops into a vertical box or chute 102, carried by the outer end of the housing and the frame of the machine. This box is open at the bottom and at the outer side, and across said outer side extend the upper and lower cross-bars 103 and 104, between which extend a plurality of wires or rods 105, forming a grating. Between the upper and lower bars and projected outwardly from the opposite sides of the box is a pair of arms 106, which are connected by a metal rod or bar 107, upon which is intermediately fulcrumed an upright lever 108, which is provided with upper and lower fork or rake heads 109 and 110, respectively, the tines or fingers of which are adapted to work through the grating formed by the rods or wires 105, thereby to form partitions to be alternately inserted and withdrawn. The lower end of the lever 108 is normally held at its inner limit by means of a helical spring 111, having its opposite ends connected to the lower cross-bar 104 and the lever, respectively, whereby the lower fork closes the lower end of the box 105, so as to support the brush as it drops into the box, and thereby to collect the brush in a bundle. When it is desired to dump the bundle of brush to the ground, the upper end of the lever 108 is moved inwardly, so as to throw the fork-head 110 outwardly, and thereby remove the support from the brush, which latter then drops to the ground. Under the inward movement of the upper end of the lever the upper fork-head 109 is projected into the top of the box just below the table 68, so as to receive the threshed brush during the dumping of the bundle of brush; and upon release of the lever the spring 111 returns the lever to its normal position, whereby the brush held by the upper fork-head is dropped upon the lower fork-head. By this means the threshed brush is conveniently collected into a bundle and then deposited upon the ground at one side of the machine, thereby obviating manual bundling of the brush. To facilitate the manipulation of the bundle collecting and dropping apparatus, a rock-shaft 112 is mounted upon the top of the housing 79 and provided with an intermediate double crank 113, and a link connection 114 is provided between the crank and the upper free end of the lever. At the front end of the rock-shaft there is provided an upstanding operating-lever 115, which is in convenient reach from the driver's seat 116, which is supported upon the frame-bars 117, projected forwardly from the top of the housing 79, whereby the dumping apparatus is under the control of the driver.

It will here be noted that the part 55, upon which the lever 54 is mounted, is carried by the bars 117. Also a rack 118 is carried by one of the bars 117 and arranged for engagement by the lever 53, which controls the clutch 52, and another rack 119 is projected rearwardly from the outer end of the same bar and arranged for engagement by the lever 8, which controls the clutch 5.

Upon reference to Fig. 3 of the drawings it will be seen that at the rear end of the wheeled frame or vehicle there is provided a substantially horizontal knife-blade 120, which is located below and in rear of the rear axle, and each end is provided with an upwardly and forwardly directed arm or bracket 121, which has its upper end connected to the rear axle 122, and a similar upwardly and rearwardly inclined arm 123, which is connected to a bracket or hanger 124, depending from the rear end of the vehicle. The purpose of this knife-blade is to cut the corn-stalks after the brush has been removed therefrom, and thereby to leave only the stubble standing in the field after the passage of the machine.

Since the stubble-cutter is not located directly in rear of the cutting mechanism for cutting off the brush of the broom-corn, but is located at the outer side thereof, it will be understood that the stubble-cutter does not act upon the row from which the brush is being cut, but acts upon the outer row, from which the brush has been removed when the machine was passing in the opposite direction. It is furthermore designed to locate the stubble-cutting means at one side of the means for severing the tops or heads of the stalks in order that the draft may be more evenly distributed than if the stubble-cutting means were located directly in rear of the severing means.

In the operation of the machine it is driven along each row of corn, so as to cut the tops or brush therefrom by the cutting apparatus 17, from which the severed tops drop onto the apron 26 under the influence of the reel 34 and then are carried transversely across the machine by the conveyer device 59, the heads of the severed brushes being brought up against the butt-board 74 by an operator, who stands upon the platform 76. The brush is then carried to the recutting-wheel 70, where the butt-ends of the stalks are cut off, and the brush is then fed to the threshing-rolls 77 and 78 by means of a conveyer 65. Under the influence of the threshing-roll the seed or corn is removed from the brush and discharged downwardly through the opening in the table 68 and the threshed brush is discharged into the bundling-box 102, from which it is finally discharged by manipulation of the controlling-lever 108, as hereinbefore described. After the brush has been severed from the stalks the latter are cut off near the ground by compact with the knife-blade 120 at the rear of the machine.

From the foregoing description it is apparent that the entire machine is operated from the ground-wheels thereof, and when in operation the machine is adapted to sever the brush from the cornstalks, to recut the brush into equal lengths to thresh the seed or corn therefrom, to bundle the threshed brush and deposit the bundles upon the ground, and finally to cut the standing stalks close to the ground, so as to leave only the stubble standing in the field.

Upon examination of Fig. 4 of the drawings it will be noted that after the severed brush has been deposited upon the apron 26 it is carried transversly across the machine in substantially the same horizontal plane without elevating or lowering the same, thereby greatly facilitating the operation of the machine.

What I claim is—

1. In a broom-corn harvester, means for severing the tops or heads of the stalks, means for recutting the heads so severed, and an evener device located between the severing means and the recutting means.

2. In a broom-corn harvester, means located at one side of the machine for severing the tops or heads of the stalks, means located at the opposite side of the machine for recutting the heads so severed, conveying means working transversely of the machine from the severing means to the recutting means, the latter being located at one side of the conveying means, and an evener device disposed substantially parallel with and at the opposite side of the conveying means and also located between the severing means and the recutting means.

3. In a broom-corn harvester, means located at one side of the machine for severing the tops or heads of the stalks, means located at the opposite side of the machine for recutting the heads so severed, conveying means working from the severing means to the recutting means, the latter being located in front of the conveying means, and an evener device located in rear of and substantially parallel with the conveying means and also disposed between the severing means and the recutting means.

4. In a broom-corn harvester, means for severing the tops or heads of the stalks, means for threshing the tops or heads so severed, an evener device for evening the severed tops or heads before the same are acted upon by the threshing means, and recutting means to recut the heads or tops after the latter have been evened and before they have been subjected to the threshing means.

5. In a broom-corn harvester, means for severing the tops or heads of the stalks, means for threshing the tops or heads so severed, an evener device for evening the severed tops or heads before the same are acted upon by the threshing means, and recutting means to recut the heads or tops after the latter have been evened and before they have been subjected to the threshing means, all of said means being located in substantially the same horizontal plane.

6. In a broom-corn harvester, means for severing the heads or tops of the stalks and located at one side of the machine, means for threshing the heads or tops so severed and located upon the opposite side of the machine, an evener device for evening the heads or tops so severed before the same are acted upon by the threshing means, and located in substantial alinement with the rear end of the threshing means, and recutting means located in front of the evener device and between the latter and the threshing means.

7. In a broom-corn harvester, means for severing the heads or tops of the stalks and located at one side of the machine, means for threshing the heads or tops so severed and located upon the opposite side of the machine, an evener device for evening the heads or tops so severed before the same are acted upon by the threshing means, and located in substantial alinement with the rear end of the threshing means, and recutting means located in front of the evener device and between the latter and the threshing means, all of said means being located substantially in the same horizontal plane.

8. In a broom-corn harvester, means for severing the tops or heads of the stalks, means for threshing the heads or tops so severed, recutting means and a normally fixed and adjustable evener device for evening the severed tops or heads before the same are acted upon by the threshing means and the recutting means.

9. In a broom-corn harvester, means for severing the heads or tops of the stalks, means for recutting the heads or tops so severed, and a normally fixed evener device for evening the severed heads or tops before the same are acted upon by the recutting means, said evener device being disposed transversely of the machine and also adjustable longitudinally thereof.

10. In a broom-corn harvester, means for severing the tops or heads of the stalks, threshing means located upon the opposite side of the machine, and a relatively fixed evener device disposed transversely of the machine, located between the severing means and the threshing means and alined substantially with the rear end of the latter and also adjustable longitudinally of the machine.

11. In a broom-corn harvester, the combination with a substantially horizontal table, of cutting apparatus located at the forward end and upon one side thereof, threshing means located at the opposite side and at the rear portion of the table, conveying means between the cutting apparatus and the threshing means, an evener device located at the rear of the platform and between the cutting apparatus and the threshing means, and recutting means located in front of and between the evener device and the threshing means.

12. In a broom-corn harvester, the combination with a substantially horizontal table, of a longitudinal drive-shaft located below the table, cutting apparatus at the forward end at one side of the table, and driven from the forward portion of the drive-shaft, threshing means located at the opposite side of the table and in rear of the cutting apparatus and also driven from the drive-shaft, an endless apron located in rear of the cutting apparatus and driven from the drive-shaft, conveyer-chains working between the apron and the threshing means and over the table and in operative relation to the drive-shaft, a normally fixed evener device carried by the table and located in rear of the conveyer-chains and between the apron and the threshing means, and recutting means located in front of and also between the evener device and the threshing means.

13. In a broom-corn harvester, the combination with means for severing the heads or tops of the stalks, threshing means, and recutting means located between the severing means and the threshing means, of means for separating partly-severed stalk portions from the heads or tops after the latter have been acted upon by the recutting means.

14. In a broom-corn harvester, the combination with means for severing the heads or tops of the stalks, threshing means, and means for recutting the severed heads before they are acted upon by the threshing means, of a plurality of alternately-operating chopping devices for removing the partly-severed butts of the heads after the same have been acted upon by the recutting means.

15. In a broom-corn harvester, the combination with a frame, of means for severing the tops or heads of the stalks, threshing means, and recutting means located in front of the threshing means, of means for removing the partly-severed butts of the heads or tops after they have been acted upon by the recutting means, and comprising a plurality of choppers having reciprocatory and intermediately-fulcrumed shank portions, and an operating-shaft therefor having a plurality of cranks connected to the outer ends of the respective shanks.

16. In a broom-corn harvester, the combination with a substantially horizontal table having front and rear portions cut away at one side thereof, of means for severing the tops or heads of the stalks located at the opposite side of the table, threshing means mounted in the rear cut-away portion of the table, conveyer means working between the severing means and the threshing means, a recutting device working in the front cut-away portion of the table and located inwardly from the threshing means, a plurality of alternately-operating chopping devices working in the front cut-away portion of the table and in rear of the recutting device, an operating-shaft mounted transversely across the front of the table and provided with a plurality of alternately-disposed cranks, shanks connecting the respective chopping devices with the corresponding cranks, and fulcrum-bearings for the intermediate portions of the respective shanks and also slidably supporting the latter.

17. In a broom-corn harvester, the combination with a substantially horizontal table having front and rear cut-away portions at one side thereof, and a longitudinal drive-shaft, of means for severing the tops or heads of the stalks located at the opposite side of the table, threshing means located at the rear cut-away portion of the table, a vertically-disposed recutting-wheel mounted in the forward cut-away portion and disposed between the threshing means and the severing means, a transverse shaft mounted across the front of the table and provided with a plurality of cranks, rake-shaped chopping devices working in the forward cut-away portion and in alinement with the recutting-wheel, shanks connecting the chopping devices with the respective cranks, conveyer-chains working over the table between the severing means and the threshing means and passing through openings in the table, and a conveyer-chain working between the recutting-wheel and the threshing means to carry the heads or tops through and away from the same, all of the parts being in operative relation to the main drive-shaft.

18. In a broom-corn harvester, means for severing the tops or heads of the stalks, means for threshing the tops or heads so severed, an evener device disposed between the severing means and the threshing means, recutting means to recut the heads or tops after the latter have been evened and before they have been subjected to the threshing means, and means for holding the severed heads or tops in engagement with the recutting means.

19. In a broom-corn harvester, the combination of means for severing the tops or heads of the stalks, means for threshing the tops or heads so severed, an evener device located between the severing means and the threshing means, recutting means to recut the heads or tops after the latter have been evened and before they have been subjected to the threshing means, and a spring-pressed shoe to hold the severed tops or heads in engagement with the recutting means.

20. In a broom-corn harvester, the combination with means for severing the tops or heads of the stalks, means for threshing the tops or heads so severed, a recutting device to recut the butts of the tops or heads, an evener device located between the severing means and the recutting device, means to convey the severed tops or heads to the recutting device, and a spring-pressed shoe located above and coöperating with the conveying means at a point adjacent to the recutting device.

21. In a broom-corn harvester, the combination with a table, of means for severing the tops or heads of the stalks, means for threshing the tops or heads so severed, an evener device located between the severing means and the threshing means, a recutting-wheel having its cutting edge projected above the table and disposed between the evener device and the threshing means, means for conveying the severed tops or heads to the recutting-wheel, and a spring-pressed shoe located above the conveyer and adjacent to the recutting-wheel.

22. In a broom-corn harvester, the combination with a frame having a housing, and means for severing the tops or heads of the stalks, of means for threshing the tops or heads so severed, recutting means in the housing for recutting the heads or tops, an evener device located between the severing means and the recutting means, a cross-bar within the housing and at one side of the recutting means, a vertically-yieldable spring-pressed cross-head supported upon the cross-bar, and shoes connected to the cross-head and depending at opposite sides of the cross-bar to hold the heads of the broom-corn in engagement with the recutting means.

23. In a broom-corn harvester, the combination with a frame having a housing, and means for severing the tops or heads of the stalks, of means for threshing the tops or heads so severed, recutting means within the housing for recutting the butts of the heads or tops, an evener device located between the severing means and the recutting means, means for conveying the broom-corn to and from the recutting means, a cross-bar located above the conveying means, a vertically-yieldable cross-head supported upon the cross-bar, a spring interposed between the cross-head and the top of the housing, and shoes lying at opposite sides of the cross-bar, each shoe consisting of an angle-iron, and opposite arms rising therefrom and connected to the cross-head.

24. In a broom-corn harvester, the combination with means for severing the tops or heads of the stalks, of means for conveying the material away from the severing means, threshing means at one side of the conveying means, recutting means located between the severing means and the threshing means at the opposite side of the conveying means and projected upwardly from beneath the latter, and a spring-pressed shoe alined above the conveyer adjacent to the recutting means and exerting a downward pressure to prevent the material from being displaced from the conveyer by the operation of the recutting means.

25. In a broom-corn harvester, the combination with means for severing the tops or heads of the stalks, recutting means, threshing means located opposite and in rear of the recutting means, and conveying means working between the recutting means and the threshing means, of means for removing the partly-severed butts of the severed heads or tops of the corn after they leave the recutting means, and means coöperating with the conveyer to hold the severed heads or tops in engagement with the recutting means and to prevent said heads and tops from being withdrawn from the threshing means.

26. In a broom-corn harvester, the combination with means for severing the tops or heads of the stalks, a recutting device, threshing means located opposite and in rear thereof, and a conveyer working from the recutting device to the threshing means, of means for removing the partly-severed butts of the severed heads of the corn after they leave the recutting device, and a spring-pressed shoe coöperating with the conveyer to hold the severed heads in engagement with the recutting device and also to prevent the heads from being withdrawm from the threshing means under the action of the means for removing the partly-severed butts.

27. In a broom-corn harvester, the combination of means for severing the tops or heads of the stalks, a recutting device, threshing means located opposite and in rear of the same, a conveyer working from the recutting device to the threshing means, alternately-operating chopping devices located in rear of the recutting device and constructed to pull the partly-severed butts from the recut heads or tops of the corn, and spring-pressed means coöperating with the conveyer to hold the heads or tops in engagement with the recutting means and also to prevent the chopping devices from pulling the heads or tops from the threshing means.

28. In a broom-corn harvester, the combination with a substantially horizontal frame, of primary cutting means at one side of the frame, threshing means at the opposite side and at the rear of the frame, a recutting device located in front of the threshing means and between the latter and the primary cutting device, conveying means working from the primary cutting device to and between the recutting device and the threshing means, means for removing the partly-severed butts of the heads or tops of the corn after passing from the recutting means, and means coöperating with the conveyer to hold the heads or tops in engagement with the recutting device and also to prevent withdrawing of the heads or tops from the threshing means.

29. In a broom-corn harvester, the combination with a substantially horizontal frame, of primary cutting means at one side of the frame, threshing means at the opposite side and at the rear of the frame, a recutting device located in front of the threshing means and between the latter and the primary cutting device, conveying means working from the primary cutting device to and between the recutting device and the threshing means, means for removing the partly-severed butts of the heads or tops of the corn after passing from the recutting device, means coöperating with the conveyer to hold the heads or tops in engagement with the recutting device and also to prevent withdrawing of the heads or tops from the threshing means, a bundle-forming chute disposed to receive the discharge from the threshing means, and means for dumping the heads or tops in bundles from the chute to the ground.

30. In a broom-corn-harvesting machine, the combination with a wheeled frame, of means for severing the tops or heads of the stalks, and a stalk-severing knife-blade located in rear of the head-severing means and adjacent to the ground, and provided at opposite ends with attaching-arms connected to the rear axle and also with the frame of the machine.

31. In a broom-corn-harvesting machine, the combination with a wheeled frame, of means located at one side of the frame and outside of the wheels for severing the tops or heads of the stalks, and stubble-cutting means carried by the frame in rear of the severing means and also disposed between the rear wheels.

32. In a broom-corn harvester, the combination of means for severing the heads or tops of the corn, means for threshing the heads or tops so severed, a toothed conveyer working from the severing means to the threshing means, and a spur-gear located between the severing means and the threshing means and also above and in coöperative relation with the conveyer to force the heads or tops into snug engagement therewith.

33. In a broom-corn harvester, the combination of means located at one side of the machine for severing the tops or heads of the corn, a casing located at the opposite side of the machine, threshing means housed within the casing, a toothed conveyer working from the severing means to the threshing means, and an idle spur-gear mounted at the front of the casing above and in coöperative relation with the conveyer to pack the severed heads or tops against the conveyer.

In testimony that I claim the foregoing as my own I have hereto affixed my signature in the presence of two witnesses.

JOHN WESLEY PEIFER.

Witnesses:
JULIA EMBRY,
GEO. D. CHAFEE.